United States Patent [19]

Hosokawa et al.

[11] Patent Number: 5,215,820
[45] Date of Patent: Jun. 1, 1993

[54] METAL-ELECTROCONDUCTIVE POLYMER COMPOSITE FINE PARTICLES AND METHOD FOR PREPARING SAME

[75] Inventors: Hiroshi Hosokawa; Kensuke Kamada, both of Hiroshima, Japan

[73] Assignee: Mitsubishi Rayon Co., Ltd., Tokyo, Japan

[21] Appl. No.: 799,228

[22] Filed: Nov. 27, 1991

[30] Foreign Application Priority Data

Nov. 30, 1990 [JP] Japan .................................. 2-339674

[51] Int. Cl.$^5$ ......................... B32B 5/16; B32B 15/02; B32B 21/02
[52] U.S. Cl. .................................... 428/403; 428/328; 428/407
[58] Field of Search ....................... 428/407, 403, 328

[56] References Cited

U.S. PATENT DOCUMENTS 4,481,303 11/1984 McIntyre et al. ................... 428/407
4,619,861 10/1986 Nakayama et al. ................. 428/407
4,774,137 9/1988 Albeits et al. ....................... 428/407
4,833,033 5/1989 Sannone et al. .................... 428/407

FOREIGN PATENT DOCUMENTS 2-120373 5/1990 Japan .
2-194071 7/1990 Japan .
2-252760 10/1990 Japan .

*Primary Examiner*—Paul J. Thibodeau
*Assistant Examiner*—D. S. Nakarani
*Attorney, Agent, or Firm*—Armstrong, Westerman, Hattori, McLeland & Naughton

[57] ABSTRACT

Metal-electroconductive polymer composite fine particles are here disclosed which comprises metal fine particles and an electroconductive polymer with which the surfaces of the metal fine particles are coated. Since the surfaces of the composite fine particles are coated with the polymer, the composite fine particles are excellent in handling properties and can be uniformly dispersed in an organic material.

5 Claims, No Drawings

METAL-ELECTROCONDUCTIVE POLYMER COMPOSITE FINE PARTICLES AND METHOD FOR PREPARING SAME

BACKGROUND OF THE INVENTION (i) Field of the Invention

The present invention relates to composite fine particles comprising a metal and an electroconductive polymer and a method for preparing the same.

(ii) Description of the Prior Art

Metal fine particles are being used nowadays in many advanced technical fields and they are one important raw material for which applications are now being researched and developed. Typical applicable fields of these fine particles include magnetic materials, electrode materials, magnetic fluids, jet fuels, additives for alloys, electroconductive coating materials, catalysts, intracellular dyes, materials for cell segregation, carriers for medicines, and electroconductive fillers for rubbers, plastics and fibers. In recent years, the above-mentioned metal fine particles are also expected as non-linear optical materials.

Such metal fine particles can usually be manufactured by a gaseous phase method or a liquid phase method. The metal fine particles are directly employed as raw materials for bulk materials such as the magnetic materials and electrode materials without any further treatment, but in other applications, they are often dispersed in a medium such as an organic material prior to their utilization.

Generally, the surface of a metal has a very high activity, and therefore it is often oxidized immediately when exposed to air. Among others, the specific surface area of the metal fine particles is much larger as compared with bulks, and for this reason, it is unavoidable that the surface oxidation has a great influence on products. Thus, the metal fine particles are usually stored in an inert gas such as nitrogen. Even if the activity of the metal fine particles is not so high, these particles tend to ignite immediately when brought into contact with air, or in an extreme case, they are in danger of exploding. Therefore, sufficient care is required not only at the time of the above-mentioned storage but also at the handling of the particles. In consequence, the cost increase for the safe assurance is not negligible.

Furthermore, the metal fine particles have very strong cohesive properties in themselves, and therefore, it is one of factors for a manufacturing technique how the cohesion is prevented in the manufacturing process of the fine particles and how a small particle size of the particles is maintained stably. In addition, also in the case that the metal fine particles are dispersed in an organic material or the like, the tendency of the cohesion is strong. Therefore, in order to maintain the desired small particle diameter in the dispersion, it is necessary to subject the particles to a pretreatment with a surface active agent.

In addition, the very small particle diameter on a nanometer level is required in certain application fields in which the metal fine particles are employed. As the manufacturing method of the metal fine particles which are applicable to such fields, there has been mainly used a gaseous phase method, but usually in this gaseous phase method, a manufacturing cost is high, and therefore the application fields are limited for an economical reason.

SUMMARY OF THE INVENTION

An object of the present invention is to provide composite fine particles which prevent the surfaces of metal particles from oxidizing and are excellent in safety of handling and in which the surfaces of the metal fine particles are coated with an electroconductive polymer.

Another object of the present invention is to provide composite fine particles basically comprising metal fine particles which can maintain a stable dispersion state in the case that the particles are dispersed in an organic material.

Still another object of the present invention is to provide a technique for economically preparing extremely fine particles on a nanometer level in which the surfaces of metal fine particles are coated with an electroconductive polymer.

That is, one aspect of the present invention is directed to metal-electroconductive polymer composite fine particles comprising metal particles and an electroconductive polymer with which the surfaces of the metal particles are coated.

Another aspect of the present invention is directed to a method for preparing metal-electroconductive polymer composite fine particles comprising metal particles and an electroconductive polymer with which the surfaces of the metal particles are coated, the method comprising the step of subjecting, to a redox reaction, a monomer capable of forming the electroconductive polymer by an oxidation reaction and a metallic compound capable of forming a redox pair with the monomer.

DETAILED DESCRIPTION OF THE PREFERRED EMBODIMENTS

Composite fine particles of the present invention are metal fine particles the surfaces of which are coated with an electroconductive polymer. Here, the electroconductive polymer means a polymer which can exert electroconductivity in an electronic state of the polymer itself, and typical examples of the electroconductive polymer include polypyrrole, polyfuran, polythiophene, polyaniline and derivatives thereof. Examples of the polypyrrole and its derivatives include homopolymers and copolymers of one or more monomers of the undermentioned pyrroles, examples of the polyfuran and its derivatives include homopolymers and copolymers of one or more monomers of the undermentioned furans, examples of the polythiophene and its derivatives include homopolymers and copolymers of one or more monomers of the undermentioned thiophenes, and examples of the polyaniline and its derivatives include homopolymers and copolymers of one or more monomers of the undermentioned anilines.

The surfaces of the metal fine particles coated with such an electroconductive polymer have very strong resistance to oxidation, and it has been confirmed that the properties of the metal fine particles undergo almost no change, even when they are allowed to stand in the air for a long period of time. This reason has not been apparent at present but can be presumed to be due to the gas barrier properties of the polymer itself and the stabilization effect of an electronic state on the metal surfaces attributed to pi-electron conjugated system of, for example, polypyrrole or the like. In addition, the metal fine particles coated with the electroconductive polymer are excellent in dispersibility and hard to cohere. This reason has not been apparent at present but can be presumed to be due to the fact that the film of the electroconductive polymer formed on the surface of the particles prevents metal particles from joining, and/or due to the repellent force of surface charges attributed to dopant ions of the electroconductive polymer and/or ions adsorbed on the composite fine particles.

As the metal constituting the composite fine particles of the present invention, any metal can be used, so long as it can be deposited by the undermentioned redox reaction. A particularly preferable example of the metal can be selected from the group consisting of gold, silver, mercury, platinum, copper, lead, tin, nickel and cobalt.

In the composite fine particles of the present invention, the whole surface of each metal fine particle is preferably coated with the electroconductive polymer, but the whole surface of each particle does not have to be always covered therewith, so long as the cohesion of the metal fine particles and the oxidation of the surfaces of the metal fine particles can be inhibited.

Furthermore, the metal fine particles constituting the nuclei of the composite fine particles of the present invention are preferably composed of 100% of the metal, but the metallic compound which has been used as the raw material may still remain in the nuclei of the composite fine particles. In the case that the metal and the metallic compound are together present in the nuclei of the composite fine particles, if the ratio of the metal to the total of both the materials is 3% by weight or more, a performance such as electroconductivity which is required for the metal can be exerted, and therefore such particles can be utilized as the composite fine particles of the present invention. The ratio of the metal to the total of both the materials is preferably 10% by weight or more and is more preferably 50% by weight or more.

The preparation method of the composite fine particles of the present invention utilizes the redox reaction of the metallic compound and the monomer capable of forming the electroconductive polymer, and in the concrete, the reduction deposition reaction of the metal and the oxidative polymerization reaction of the monomer for the electroconductive polymer are utilized as the redox pair. According to this method, the monomer is polymerized simultaneously with the deposition of the metal, and as a result, the composite fine particles can be obtained which have a size of about 1 nanometer in the case of the smaller particles and a size of about 1 mm in the case of the larger particles. The average particle size of the composite fine particles is preferably in the range of from 3 nm to 50 μm. The reason why the size of the resulting composite fine particles become uniform is considered to be that the reaction of the deposition/enlargement of the metal and the polymerization of the monomer capable of forming the electroconductive polymer so as to coat the metal competitively take place, whereby the metal can be coated with the electroconductive polymer prior to the cohesion and enlargement of the metal particles. The control of the size of the composite fine particles can be carried out through the proper selection of such conditions as the concentration of raw materials in the solution, the types of solvents, the presence or absence of poor solvents, the degree of polymerization of the polymeric electrolyte and the copolymerization composition of the polymeric electrolyte.

Here, examples of the monomer capable of forming the electroconductive polymer by the oxidation reaction include monomers of pyrroles, furans, thiophenes and anilines. Exemplary monomers of the pyrroles include pyrrole, 2-acetyl-N-methylpyrrole, 3-acetyl-N-methylpyrrole, 2-acetylpyrrole, 1-aminopyrrole, bilirubin, 2,5-dimethylpyrrole, N-methylpyrrole, N-methylpyrrole-2-methyl acetate, N-methylpyrrole-2-acetonitrile, 3-nitropyrrole, 4-nitropyrrole-2-carboxylic acid, ethyl 4-nitropyrrole-2-carboxylate, N-n-octadecylpyrrole and 1-phenylpyrrole. Exemplary monomers of the furans include furan, dimethylfuran, furancaroxylic acid, ethyl furancarboxylate, isoamyl furancarboxylate, methoxyfuran and methylfuran. Exemplary monomers of the thiophenes include thiophene, acetylthiophene, bromothiophene, n-butylthiophene, chlorothiophene, n-decylthiophene, n-dodecylthiophene, ethylthiophene, n-heptylthiophene, n-hexylthiophene, iodothiphene, methylthiophene, n-nonylthiophene, n-octylthiophene, n-pentylthiophene, phenylthiophene, propionylthiophene, n-propylthiophene, tarthiophene and n-undecylthiophene. Exemplary monomers of the anilines include aniline, bromoaniline, bromoaniline hydrochloride, chloroaniline, chloroaniline hydrochloride, dibromoaniline, dichloroaniline, diethoxyaniline, diethylaniline, difluoroaniline, fluoroaniline, diisopropylaniline, dimethoxyaniline, dinitroaniline, ethylaniline, n-heptylaniline, n-hexylaniline, iodoaniline, isopropylaniline, nitroaniline, tribromoaniline, trichloroaniline, trifluoroaniline, trimethoxyaniline and trimethylaniline.

The polypyrrole, polyfuran, polythiophene, polyaniline and derivatives thereof which can be obtained from these monomers exhibit electroconductivity.

On the other hand, as the metallic compound which will be subjected to the redox reaction with the above-mentioned monomer, any metallic compound can be used, so long as it contains, as a constitutional component, a metal capable of forming the redox pair with the monomer. Here, that the monomer and the metal can form the redox pair means that the polymerization reaction of the monomer and the deposition reaction of the metal can simultaneously proceed, for example, as in the case that the oxidation potential of the monomer is lower than the deposition potential of the metal. Further, there are cases in which the redox reaction proceeds by light irradiation, such as in the case of silver compounds, and the use of these metallic compounds is also preferable.

Examples of the metallic compound include compounds for releasing or producing metal ions and metal-containing ions such as $Au^+$, $AuBr_4^-$, $AuCl_4^-$, $Ag^+$, $Hg_2^{2+}$, $PtCl_4^{2-}$, $PtBr_4^{2-}$, $Cu^+$, $Cu^{2+}$, $HgI_4^{2-}$, $Pb^{2+}$, $Sn^{2+}$, $Ni^{2+}$ and $Co^{2+}$.

The compound for providing the above-mentioned metal source need not always be soluble. However, it is preferable that the compound is soluble, because the compound can be present in the form of ions in a liquid phase and the production reaction of the composite fine particles can proceed in the state of the homogeneous reaction. Irrespective of the compound being insoluble or sparingly soluble, if the metallic compound of the raw material is dispersed in the form of fine particles such as a colloid state in the liquid phase, the production reaction of the composite fine particles proceeds in the state of a heterogeneous reaction and similar results can be obtained.

Typical examples of the metallic compound which is insoluble or sparingly soluble include $PbO_2$, $Hg_2Cl_2$, AgCl, CuCl, AgBr, CuBr, AgI and CuI. Metal salts of polymers and surface active agents can also be used similarly as the compounds for providing the metal source.

The redox reaction between the monomer and the metallic compound can proceed in a wide temperature range, and for example, the reaction can be performed even in the range of from $-100°$ C. to $+200°$ C. The above-mentioned reaction can be carried out in an aqueous system. No particular restriction need be placed on the amount of the monomer forming the electroconductive polymer in the reaction system. However, since the metal-forming reaction and the polymerization reaction which forms the electroconductive polymer together form the redox pair, these reactions will proceed stoichiometrically. On the other hand, the doped ions are indispensable to the formation of the electroconductive polymer, and the relationship between the amount of dopant ions and the amount of electroconductive polymer formed is stoichiometrical. Thus, when there is an imbalance in the relationship between the amounts of the three components, i.e., the monomer which forms the electroconductive polymer, the metallic compound, and the dopant ions, the yield of the composite fine particles will decrease. In particular, it is preferable for the preparation of composite fine particles according to the present invention that the amounts of the monomer which forms the electroconductive polymer and the metallic compound not be relatively high compared to the amount of the doped ions, because the tendency of deposition and precipitation of the metal will increase.

In order to remove as much as possible of the dissolved oxygen, oxidizing agent and reducing agent which are not raw materials from the reaction system, it is preferred to carry out the bubbling of an inert gas such as a nitrogen gas during the reaction. In particular, oxygen must be removed sufficiently, because oxygen inconveniently functions as the oxidizing agent to control the reaction and to lower the purity of the product at times.

In addition, in the preparation method of the above-mentioned composite fine particles, when a polymeric electrolyte is used as a dopant, the composite fine particles having a relatively uniformly controlled particle diameter can be conveniently obtained. Examples of the polymeric electrolyte include polyanionic substances. Examples of the polyanionic substances include homopolymers and copolymers containing monomer units having anionic functional groups such as $-COO^-$, $-SO_3^-$, $-OSO_3^-$, $-O^-$ and $-S^-$.

Typical examples of the polyanionic substances include polyacrylic acid, polymethacrylic acid, polyvinylsulfuric acid, polystyrenesulfonic acid, salts thereof and copolymers having monomer units thereof. The reason why the particle diameter can be uniformly controlled by the use of such a polymeric electrolyte has not been apparent so far, but this functional effect is considered to be due to the so-called polymer effect that the metal ions coordinate to the polymeric electrolyte, and the high concentration region of the metal ions is locally formed in a reaction solution and the reaction occurs continuously. Moreover, the particle diameter of the composite fine particles is presumed to be concerned with the concentration of the polymeric electrolyte in the solution, the presence or absence of association, the distribution state of molecular chains and the like.

As electrolytes other than mentioned above, polycationic substances can be used. Particularly, when anionic metal-containing ions such as $AuBr_4^-$, $AuCl_4^-$, $PtCl_4^{2-}$, $PtBr_4^{2-}$ or $HgI_4^{2-}$ are used as the metal source, it is more effective to use the polycationic substance as the electrolyte. Examples of the polycationic substance include homopolymers and copolymers containing monomer units having cationic functional groups such as $-NH_3^+$, $=NH_2^+$, $\equiv NH^+$ and $\equiv N^+\equiv$.

Typical examples of the polycationic substance include polyvinylamine, polyallylamine, polyethyleneimine, halogenated poly-4-vinyl-N-alkylpyridinium, polymethacrylic acid dimethylaminoethylmethyl chloride and copolymers having these monomer units.

In the case that the polymeric electrolyte is the copolymer, as a copolymerizable component which is contained together with the monomer unit forming the polyanionic substance or the polycationic substance, any monomer unit can be used. However, typical examples of such a monomer unit include dienes, alkenes, acrylic acid and its derivatives, α-substituted acrylic acids and its derivatives, vinyl halides, vinyl esters, and styrene and its derivatives. Moreover, examples of the copolymerizable component include polyesters, polycarbonates, polyamides, polyamino acids, polyureas, polyurethanes, polyimines, polysulfides, polyphosphates, polysiloxanes, polysilsesquioxanes, celluloses and derivatives thereof. Moreover, since ceramics such as silica, iron oxide, aluminum oxide, titanium oxide, and aluminum nitrate display ionic characteristics due to the dissociation of hydroxyl groups on their surface, these substances can be used as the polymeric electrolyte.

The polymeric electrolyte preferably has 5 or more anionic or cationic monomer units, more preferably 10 or more units, and most preferably 20 or more units.

No particular restriction is put on the amount of the polymeric electrolyte in the reaction solution, but when the concentration of the polymeric electrolyte is high, the reaction solution easily gels along with the progress of the reaction. This reason can be presumed as follows: During the production of the electroconductive polymer, the polymeric electrolyte is taken thereinto as the dopant. Thus when the concentration of the polymeric electrolyte increases and the molecular chains of the polymeric electrolyte are sufficiently entangled, the produced fine particles form crosslinked points to bring about the gelation.

Even if the gelation occurs, the obtained product is in the form of the metal-electroconductive composite fine particle dispersion gel, which is considered to be the production of the composite fine particles of the present invention. However, the above-mentioned conditions are not desirable to obtain the composite fine particles in the form of a colloidal dispersion.

When the concentration of the polymeric electrolyte in the reaction solution is in excess of 10% by weight, the product tends to gel, and when it is more than 50% by weight, the diffusion rate of the reaction materials is extremely low, with the result that it is actually difficult to produce the composite fine particles of the present invention. In this connection, when the concentration of the polymeric electrolyte in the reaction solution is less than 0.01% by weight, the addition effect of the polymeric electrolyte is insufficient.

In the practice of the method for preparing the composite fine particles according to the present invention, the monomer may be added dropwise to the solution or suspension of the metallic compound, or alternatively the solution or suspension of the metallic compound may be added dropwise to a monomer solution.

Now, the present invention will be described in detail in reference to examples.

EXAMPLE 1

100 ml of a 0.1N aqueous silver nitrate solution made by Wako Pure Chemical Industries, Ltd. were stirred at room temperature under the bubbling of nitrogen, and 300 ml of a 1M aqueous pyrrole solution were added dropwise thereto over about 2 hours by the use of a dropping funnel. The solution was stirred for about 12 hours under the bubbling of nitrogen and then placed in a cellophane tube (a visking tube made by Nippon Medical Science Co., Ltd.), and dialysis was then carried out for about one week with deionized water. The thus treated solution was dropped on an observation mesh of a transmission type electron microscope and then dried sufficiently. Afterward, the solution was observed through the transmission type electron microscope JEM-100 CXII made by JEOL Ltd., and it was confirmed that composite fine particles having a particle diameter of several nanometers were produced.

EXAMPLE 2

1.0 g of potassium polyvinylsulfate for colloid titration made by Wako Pure Chemical Industries, Ltd. was dissolved in 100 ml of a 0.1N aqueous silver nitrate solution made by Wako Pure Chemical Industries, Ltd., and the solution was then stirred at room temperature under the bubbling of nitrogen. Next, 300 ml of a 0.1M aqueous pyrrole solution were added dropwise thereto by the use of a dropping funnel, so that a gray dispersion was obtained. The solution was stirred for about 12 hours under the bubbling of nitrogen and then dialyzed for about one week with deionized water by the use of a cellophane tube. The thus treated solution was diluted about 100 times, dropped on an observation mesh of a transmission type electron microscope, and then dried sufficiently. Afterward, the solution was observed through the transmission type electron microscope JEM-100 CXII made by JEOL, Ltd., and it was confirmed that composite fine particles having a relatively uniform particle size distribution and a particle diameter of several tens of nanometers were produced.

EXAMPLE 3

The same procedure as in Example 1 was effected except that a 0.1N aqueous silver nitrate solution was replaced with a 0.01N aqueous chloroauric acid solution. The thus obtained solution was observed, and it was confirmed that composite fine particles having a particle diameter of several tens of nanometers were produced.

EXAMPLE 4

The same procedure as in Example 2 was effected except that a 0.1N aqueous silver nitrate solution was replaced with a 0.01N aqueous chloroauric acid solution and 1.0 g of potassium polyvinylsulfate was replaced with 1 g of polyallylamine hydrochloride PAA.HCL-IOS made by Nitto Boseki Co., Ltd. The thus obtained solution was observed in the same manner as in Example 2, and it was confirmed that composite fine particles having a relatively uniform particle size distribution and a particle diameter of several tens nanometers were produced.

EXAMPLE 5

The same procedure as in Example 2 was effected except that a 0.1N aqueous silver nitrate solution was replaced with a 0.1N aqueous copper (II) sulfate solution. The thus obtained solution was observed in the same manner as in Example 2, and it was confirmed that composite fine particles having a relatively uniform particle size distribution and a particle diameter of several nanometers were produced.

The average particle diameters and yields (based on the metallic compounds) of the composite fine particles obtained in the above-mentioned examples are set forth in table 1. Furthermore, the dispersions of the composite fine particles of Examples 2, 4 and 5 maintained a stable dispersion state even one year after the preparation, and as a result of the observation through the electron microscope, it was confirmed that alteration such as cohesion was not observed and the particle diameter did not change, either.

TABLE 1

| Example | Average Particle Diameter | Yield |
|---------|---------------------------|-------|
| 1 | 4 nm | |
| 2 | 80 nm | 84% |
| 3 | 60 nm | |
| 4 | 30 nm | 77% |
| 5 | 6 nm | 81% |

COMPARATIVE EXAMPLE 1

The same procedure as in Example 2 was effected except that 300 ml of a 0.1M aqueous pyrrole solution were replaced with 100 ml of a 1M aqueous ethanol solution, and in this case, silver particles precipitated during reaction. In consequence, any good dispersion of the silver fine particles could not be obtained.

COMPARATIVE EXAMPLE 2

3.33 g of polyvinyl pyrrolidone K-30 made by Tokyo Chemical Industry Co., Ltd. were dissolved in 300 ml of ion-exchanged water, and 30 ml of a 0.1N aqueous silver nitrate solution were added dropwise thereto. Next, 30 ml of a 0.1N aqueous hydrochloric acid solution were added dropwise to the solution to prepare a colloid of silver chloride. 13.8 g of ethanol were then added to the colloid, followed by stirring at 70° C. for 24 hours, thereby obtaining a light pink silver fine particle colloid dispersion.

This dispersion was neutralized with potassium carbonate, and then dialyzed by the use of a cellophane tube. At this time, precipitation took place about 24 hours after the beginning of the dialysis, and any good dispersion of the silver fine particles could not be obtained.

EXAMPLE 6

An Example in which Sodium Polyacrylate was used as Dopant Ions 6.06 g of potassium nitrate were dissolved in 300 ml of ion-exchanged water, 2.82 g of sodium polyacrylate (a food additive sodium polyacrylate made by Wako Pure Chemical Industries, Ltd.; polymerization degree 15,000–20,000) were dissolved in the solution. Next, 100 ml of a 0.3N aqueous silver nitrate solution were added dropwise thereto, and 100 ml of a 0.3M ethanol solution of pyrrole were further added dropwise. The solution was stirred at 50° C. for 48 hours to obtain a blackish gray colloid dispersion. This dispersion was then dialyzed by the use of a cellophane tube.

The thus obtained colloid dispersion was observed through an electron microscope, and it was confirmed that composite fine particles having a particle diameter of about 50 nm were produced. Yield was 71%.

EXAMPLE 7

An Example in which Colloidal Silica was used as Dopant Ions 25 ml of colloidal silica "Cataloid-SI-80P" made by Catalysts & Chemicals Industries Co., Ltd. were diluted with 175 ml of ion-exchanged water, and 50 ml of a 0.1N aqueous silver nitrate solution were added dropwise with stirring to prepare a solution A. Next, 0.33 ml of pyrrole was dissolved in 100 ml of ion-exchanged water, and the solution A was added dropwise thereto with stirring. The solution was stirred at room temperature for 24 hours and then dialyzed by the use of a cellophane tube, thereby obtaining a blackish gray colloid dispersion. The thus obtained colloid dispersion was observed through an electron microscope, and it was confirmed that silver and the polypyrrole were composed on the surfaces of the colloidal silica particles.

EXAMPLE 8

An Example in which a Polymeric Electrolyte was Polyethyleneimine 300 ml of a 2% aqueous solution of polyethyleneimine made by Nippon Shokubai Kagaku Co., Ltd. were prepared. Next, 100 ml of a 0.1M aqueous sodium chloroaurate solution were added dropwise thereto with stirring, and a 0.3M ethanol solution of pyrrole was further added dropwise. The thus obtained product was observed through an electron microscope, composite fine particles having a particle diameter of about 90 nm were confirmed.

EXAMPLE 9

An Example in which a Metal was Platinum

The same procedure as in Example 4 was effected except that a 0.01N aqueous chloroauric acid solution was replaced with a 0.01M aqueous potassium chloroplatinate $K_2(PtCl_4)$ solution. The product was observed through an electron microscope, composite fine particles having a particle diameter of about 90 nm were confirmed.

EXAMPLE 10

An Example in which a Metal was Nickel

The same procedure as in Example 2 was effected except that 100 ml of a 0.1N aqueous silver nitrate solution were replaced with 50 ml of a 0.1M aqueous nickel chloride $NiCl_2$ solution. The product was observed through an electron microscope, composite fine particles having a particle diameter of about 100 nm were confirmed.

EXAMPLE 11

An Example in which a Metal was Cobalt

The same procedure as in Example 2 was effected except that 100 ml of a 0.1N aqueous silver nitrate solution were replaced with 50 ml of a 0.1M aqueous cobalt sulfate $CoSO_4$ solution. The product was observed through an electron microscope, composite fine particles having a particle diameter of about 20 nm were confirmed.

EXAMPLES 12 to 15

Examples in which Monomers for an Electroconductive Polymer were Aniline, Thiophene and Furan 4.87 g of potassium polyvinylsulfate were dissolved in 300 ml of ion-exchanged water, and the solution was transferred to a brown bottle. Next, 100 ml of a 0.1N aqueous silver nitrate solution were added dropwise thereto over about one hour. 100 ml of a 0.1M ethanol solution of each of monomers for electroconductive polymers shown in Table 2 were further added dropwise to the solution over about 1 hour. This solution was transferred to a colorless transparent flask, followed by stirring at 50° C. for 12 hours.

The reaction solution was neutralized with potassium carbonate and then dialyzed by the use of a cellophane tube. The product was observed through an electron microscope, and composite fine particles having particle diameters shown in Table 2 were confirmed.

TABLE 2

| Example | Monomer for Electroconductive Polymer | Diameter of Fine Particles |
| --- | --- | --- |
| 2 | Pyrrole | 5 nm |
| 13 | Aniline | 10 nm |
| 14 | Thiophene | 20 nm |
| 15 | Furan | 20 nm |

As is apparent from the above detailed description, in metal-electroconductive polymer composite fine particles of the present invention, the surfaces of metal fine particles are coated with an electroconductive polymer, and therefore the composite fine particles can prevent the surface oxidation of the metal fine particles and are excellent in the safety of handling. Furthermore, in the case that they are dispersed in a medium such as an organic material when used, they are advantageously hard to cohere. According to a method for preparing the composite fine particles of the present invention, the cohesion of the particles during a manufacturing process which is the problem of a conventional liquid phase method can be solved, whereby the fine particles having a diameter on a level of several nanometers can be obtained by using the economical liquid phase method. In consequence, the present invention is very useful in fields in which the metal fine particles are utilized.

What is claimed is:

1. Metal-electroconductive polymer composite particles comprising metal particles having an average particle size in the range of from 3 nm to 50 μm, and an electroconductive polymer containing a polymeric electrolyte as a dopant coated on the surfaces of the metal particles.

2. The composite according to claim 1, wherein the metal is gold, silver, platinum, copper, lead, tin, nickel or cobalt.

3. The composite according to claim 1, wherein the electroconductive polymer is a polypyrrole, polyfuran, polythiophene or polyaniline, or a derivative thereof.

4. The composite according to claim 1, wherein the polymeric electrolyte is a polymer or copolymer of acrylic acid, methyacrylic acid; vinylsulfuric acid, styrenesulfonic acid or a salt thereof; a vinylamine, allylamine, ethyleneimine, halogenated 4-vinyl-N-alkylpyridinium or methyacrylic acid dimethylaminomethyl chloride.

5. The composite according to claim 1, wherein the polymeric electrolyte is a ceramic selected from the group consisting of silica, iron oxide, aluminum oxide, titanium oxide and aluminum nitrate.

* * * * *